United States Patent [19]
Turak et al.

[11] Patent Number: 5,450,997
[45] Date of Patent: Sep. 19, 1995

[54] BRAZING FIXTURE FOR HEAT EXCHANGER

[75] Inventors: Thomas M. Turak, Woodhaven, Mich.; Robert F. Brandt, Hagerstown, Ind.; David O. Meyn, Dearborn Heights, Mich.

[73] Assignee: Ford Motor Company, Dearborn, Mich.

[21] Appl. No.: 82,702

[22] Filed: Jun. 28, 1993

[51] Int. Cl.6 .................................................. B23K 1/08
[52] U.S. Cl. ..................................... 228/183; 228/212
[58] Field of Search ................... 228/183, 212; 29/726

[56] References Cited

U.S. PATENT DOCUMENTS

| | | | |
|---|---|---|---|
| 2,443,574 | 6/1948 | Burns | 228/183 |
| 2,794,243 | 6/1957 | Schweller | 228/183 |
| 3,368,260 | 2/1968 | Schneider | 29/890.54 |
| 3,489,448 | 1/1970 | Nagara et al. | 228/212 |
| 3,726,466 | 4/1973 | Vedder et al. | 228/44.3 |
| 3,800,861 | 4/1974 | Flitner et al. | 165/111 |
| 3,894,580 | 7/1975 | Chartet | 29/466 |
| 4,124,445 | 11/1978 | Mollon | 248/68 R |
| 4,700,469 | 10/1987 | Kroetsch et al. | 29/726 |
| 5,004,045 | 4/1991 | Le Gauyer | 228/212 X |
| 5,165,163 | 11/1992 | Pardi | 29/726 |
| 5,230,197 | 7/1993 | Hart | 52/638 |

FOREIGN PATENT DOCUMENTS

| | | | |
|---|---|---|---|
| 64043 | 5/1977 | Japan | 228/183 |
| 120474 | 9/1980 | Japan | 228/183 |
| 63-281771 | 11/1988 | Japan | 228/183 |

*Primary Examiner*—Kenneth J. Ramsey
*Attorney, Agent, or Firm*—Raymond L. Coppiellie; Roger L. May

[57] ABSTRACT

An apparatus for holding a heat exchanger core 22 during a manufacturing process is disclosed. The core includes a first 24 and second 26 side support member disposed on opposite sides of an assembly of a plurality of interleaved tubes 28 and fins 30. The apparatus comprises a pair of elongated rod members 38, 40, releasably engaging locating apertures 34, 36, 34', 36' of the first 24 and second 26 side support members in an overlapping, crosswise relationship. The rod members 38, 40 apply constant compressive force between the side support members to hold the plurality of tube and fins together during the manufacturing process and prevent the heat exchanger core from skewing.

1 Claim, 1 Drawing Sheet

BRAZING FIXTURE FOR HEAT EXCHANGER

BACKGROUND OF THE INVENTION

1. Field of the Invention

The present invention relates generally to an apparatus for holding a heat exchanger core during a brazing operation.

2. Background Information

Typical heat exchanger cores are manufactured by assembling a plurality of tubes-interleaved with fins between a pair of side support members. The core is precompressed by a variety of known methods prior to the brazing operation to maintain the tube and fins in proper relationship. One known method is to precompress the core with a steel band surrounding the core before brazing. After banding, the core is inserted into a furnace and heated until it brazes together. Following the brazing process, the steel bands are cut off each heater core and discarded, resulting in a large amount of waste. In addition, these bands often distort and/or skew the core which can result in leaks and/or improper vehicle fit.

Other types of brazing fixtures have been proposed such as that shown in U.S. Pat. No. 5,165,163, assigned to the assignee of the present invention. In that system, the brazing fixture includes a pivotal lever which applies a compressive force against one of the side support members while the other side support member is held stationary in the fixture. However, these fixtures tend to become corroded in the brazing atmosphere, reducing the effectiveness of the compressive force applied against the core. Also, these fixtures usually are not used upstream of the braze process due to sheer weight and bulk.

A third type of brazing fixturing is proposed in U.S. Pat. No. 3,894,580 and which is shown schematically in FIG. 1. In FIG. 1, a heat exchanger core 10 includes a pair of side support members 12 disposed on opposite sides of an assembly of a plurality of interleaved tubes 14 and fins 16. A pair of header assemblies 18 are disposed on opposite sides of the heat exchanger core in known construction. In this prior art system, a pair of generally parallel ties 20 extend between each of the side support members 12 to fix the core in a predetermined position prior to the brazing operation. The disadvantages of using the generally parallel ties 20 is that unless an elaborate and complicated clamping mechanism, such as shown in U.S. Pat. No. 3,894,580 is utilized on each end of the ties 20, the heat exchanger core can still skew as a result of normal process handling and/or shrinkage and thermal cycling during the brazing operation. This skewing or misalignment of the heat exchanger core often results in deleterious effects upon the core such as leaking and/or improper vehicle fit.

It would, therefore, be advantageous to provide an effective, simple fixturing apparatus which can easily be used during the fabrication, processing, and brazing of the heat exchanger core to prevent the skewing or misalignment of the heat exchanger core.

SUMMARY OF THE INVENTION

It is an object of the present invention to provide a brazing apparatus which eliminates steel banding associated with known heat exchanger core manufacturing methods and which applies a constant compressive force during the brazing process in a much more cost effective and less complicated structure.

The present invention solves the problems associated with the prior art by providing an apparatus for holding a heat exchanger core during the brazing process, the core including a first and second side support member disposed on opposite sides of an assembly of a plurality of interleaved tubes and fins. Each of the first and second side support member includes a pair of apertures disposed at generally opposite ends thereof. The apparatus comprises a pair of elongated rod members releasably engaging the apertures in the first and second side support members in an overlapping, crosswise relationship such that the first rod member extends from a first aperture on the first side support member to a first, diametrically opposed aperture on the second support member. A second rod member extends from a second aperture on the first side support member to a second, diametrically opposed aperture on the second side support member. In this manner, the pair of rod members applies a continuous compressive force between the side support members to hold the plurality of tube and fins together in a predetermined position during the manufacturing process. After the brazing process, the pair of rod members are removed from the heat exchanger's side supports and can easily be reused multiple times.

These and other objects, features and advantages of the present invention will become apparent from the following drawings, detailed description, and claims which follow.

DETAILED DESCRIPTION OF THE PREFERRED EMBODIMENTS

Figure 2:
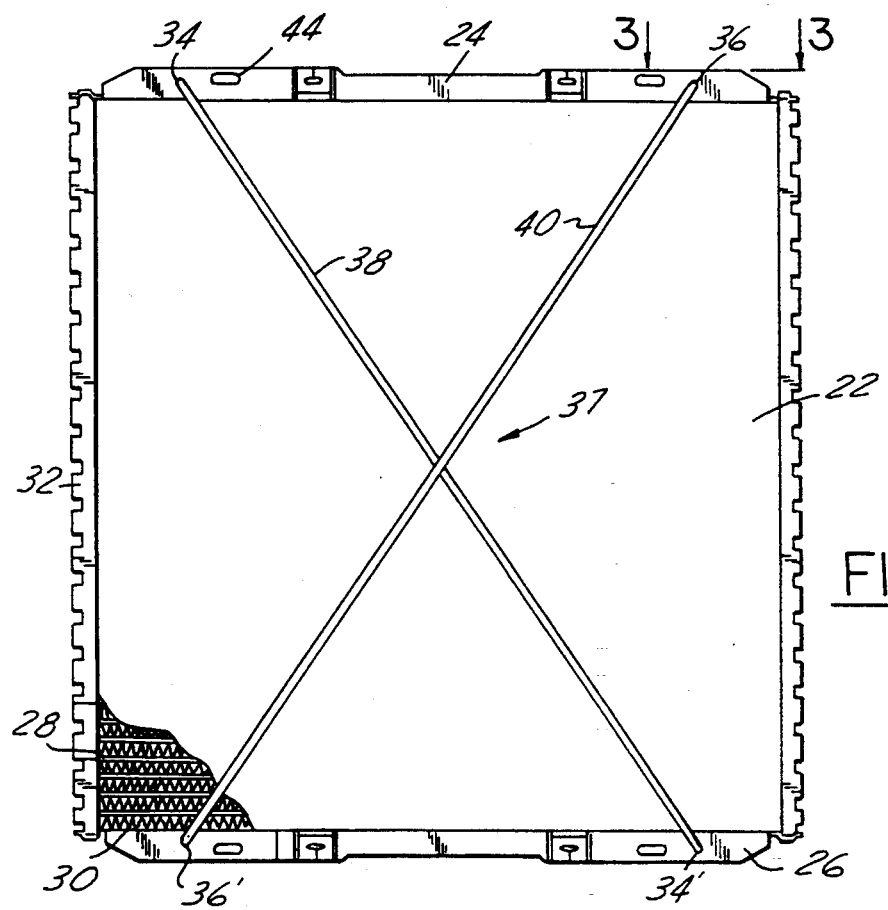
FIG. 2 is a perspective view of a heat exchanger core assembled utilizing a brazing apparatus structured in accord with the principles of the present invention.

Referring now to FIG. 2, a heat exchanger core, such as a radiator core 22 includes a first side support member 24 and a second side support member 26 disposed on opposite sides of an assembly of a plurality of interleaved tubes 28 and fins 30 such as is constructed in a known manner. The first side support member 24 includes a pair of locating apertures, a first aperture 34 and second aperture 36. Likewise, the second side support member 26 also includes a pair of locating apertures, a first aperture 34' and a second aperture 36'. The first apertures 34, 34' are diametrically opposite one another as are the second apertures 36, 36'. As shown in FIG. 2, the apertures 34 and 36 are generally circular, but alternatively may comprise an elongated slot such as shown at 44 or may also include an elongated slot having a keyed feature (not shown) therein. It will become apparent to one of ordinary skill in the art that the shape of the locating apertures can be varied widely and still be within the scope of the present invention. A pair of header assemblies 32 complete the radiator core 22 construction.

Prior to brazing the radiator core 22, a brazing fixture 37, structured in accord with the present invention, is utilized to hold the core under a compressive force to maintain the interleaved tube and fin assembly in its proper orientation. The brazing fixture of the present invention comprises a pair of elongated rod members 38, 40 releasably engaging the locating apertures 34, 34', 36, 36' of the first 24 and second 26 side support members, respectively, in an overlapping, crosswise relationship as shown in FIG. 2. Specifically, the first rod member 38 extends from the first aperture 34 in the side support member 24 to the first, diametrically opposed aperture 34' on the second side support member 26. The second rod member 40 extends from the second aperture 36 on the first side support member 24 to the second diametrically opposed aperture 36' on the second side support member 26.

Figure 1:
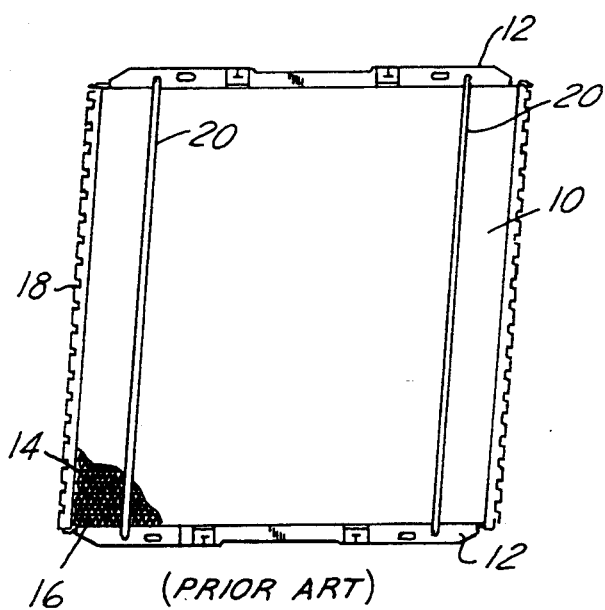
FIG. 1 is a perspective view of a heat exchanger core assembled using prior art brazing fixtures.
Figure 3:
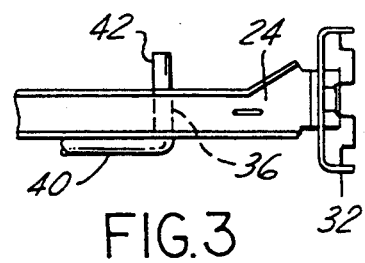
FIG. 3 is a sectional view along line 3—3 of FIG. 2.

As shown in further detail in FIG. 3, each of the rod members 38, 40 includes a leg member 42 projecting from each end thereof. The leg members 42 releasably engage the locating apertures in the first and second side support members. In this manner, a very simple construction of the rod members 38, 40 can be utilized and the pair of rod members can be easily inserted and removed from the radiator core 22 to be used a multiple number of times with little degradation of the efficiency of the fixturing system. It should be apparent to those skilled in the art that the shape of the leg members 42 of each of the rod members 38, 40 will assume the shape of the locating apertures into which it is received.

It should also be apparent to those skilled in the art that the coefficient of thermal expansion of the rod members 38, 40 must be different, or less than the coefficient of thermal expansion of the plurality of interleaved tubes and fins of the radiator core 22, so that a compressive force can be maintained between the side support members 24 and 26 by the pair of rod members 38, 40 to hold the radiator core 22 in its predetermined position during the brazing process.

A method of assembling a radiator core using a brazing fixture according to the present invention will now be described. The first step in such a method is to assemble a plurality of tubes and fins 28, 30 interleaved together into a subassembly. The header assemblies 32 and the side support members 24, 26 are placed on the respective ends of the subassembly to form a radiator core 22. It should be apparent that each of the components of the radiator core 22 are coated with the appropriate brazing flux and materials to accomplish the brazing of the core. The core 22 is then precompressed mechanically and the first elongated rod member 38 is placed in the diametrically opposed first apertures 34, 34' of the first and second side support members 24 and 26, respectively. Likewise, the second rod member 40 is placed into its respective locating holes 36, 36'. With the rods now in place, the core is both held in compression and is also prevented from skewing. The core is then processed through a de-greaser and placed into a brazing furnace. The core is heated to a temperature sufficient to cause the core to braze together followed by a cooling stage prior to removing the elongated rods 38, 40 from the-core 22. It should be noted here that because of the tensile forces being exerted by the tube and fin subassembly acting against each of the side support members 24, 26, the elongated rod members 38, 40 and their respective leg members 42 remain in position in the locating apertures of each of the side support members.

It should be readily apparent to those skilled in the art that various modification and alterations of the present invention are readily available without departing from the spirit and scope of the present invention. For example, the elongated rods may be formed from a variety of materials, such as stainless steel in the preferred embodiment, and in a variety of configurations to accommodate heat exchangers of various shapes and sizes. The elongated rods may be utilized to braze other heat exchangers, not simply limited to brazing of radiator cores. Accordingly, it is the following claims, including all equivalents, which determine the scope of the invention.

What is claimed is:

1. An automotive heat exchanger assembly to be brazed, comprising:

a heat exchanger core including a first and second side support members disposed on opposite sides of an assembly of a plurality of interleaved tubes and fins, each of said first and second side support members having a pair of elongated slots disposed at generally opposite ends thereof; and means for applying a compressive force to said core during the brazing operation, said means comprising:

a pair of elongated rod members releasably engaging said elongated slots of said first and second side support members in overlapping, crosswise relationship such that a first rod member extends from a first slot on the first side support member to a first, diametrically opposed slot on the second side support member and a second rod member extends from a second slot on the first side support member to a second, diametrically opposed slot on the second side support member, each of said rod members being fabricated from a material having a coefficient of thermal expansion different from the coefficient of thermal expansion of said plurality of interleaved tubes and fins and including a leg member projecting from opposite ends thereof, said leg members being adapted to releasably engage said locating elongated slots in said first and second side support members, said pair of rod members being operative to apply a continuous compressive force between said side support members to hold said plurality of tube and fins together in a predetermined position during the brazing process.

* * * * *